United States Patent Office 3,792,092
Patented Feb. 12, 1974

3,792,092
BIS(2,3-DIMETHYLENEBUTYL)AMINES
Dale Robert Coulson, Wilmington, Del., assignor to E. I. du Pont de Nemours and Company, Wilmington, Del.
No Drawing. Filed Jan. 4, 1971, Ser. No. 103,837
Int. Cl. C07c 87/24
U.S. Cl. 260—583 H     2 Claims

ABSTRACT OF THE DISCLOSURE

Novel polymer-forming bis(2,3 - dimethylenebutyl) amines, e.g. N,N-bis(2,3-dimethylenebutyl)amines are prepared from allene and ammonia or certain amines in the presence of a palladium or rhodium catalyst.

BACKGROUND OF THE INVENTION

(1) Field of the invention

This invention relates to, and has as its principal objects provision of, polymerizable bis(2,3 - dimethylenebutyl) amines, and their preparation from allene and ammonia or a primary amine in the presence of a palladium or rhodium catalyst.

(2) Prior art

Before the present invention, bis(2,3-dimethylenebutyl) amines and corresponding polymers were unknown.

Related to but nonsuggestive of the present amine monomers is a known reaction of butadiene and amines to yield bis(octa-2,7-dienyl)amines in the presence of bis(triphenylphosphine)(maleic anhydride)palladium(O) [Takahashi et al., Bull. Soc. Chem., Japan, 41, 454 (1968)].

SUMMARY OF THE INVENTION

The monomers of this invention can be defined broadly as compounds of the formula $$\left(\underset{CH_3-\overset{CH_2}{\overset{\|}{C}}-\overset{CH_2}{\overset{\|}{C}}-CH_2}{}\right)_2 \overset{R}{\underset{|}{N}}$$

wherein R is hydrogen or alkyl. The term alkyl as used herein includes linear or branched alkyl groups containing up to 18 carbons.

Representative R groups other than hydrogen are methyl, ethyl propyl, isopropyl, butyl, isobutyl, tertiary butyl, neopentyl, hexyl, octyl, isooctyl, and 2-ethylhexyl. Additional representative R groups are decyl, dodecyl, tetradecyl and octadecyl.

Homopolymers and copolymers of the bis(2,3-dimethylenebutyl)amines are prepared by vinyl-type polymerization, and the comonomers with which copolymers are prepared are vinyl monomers. Preferred comonomers are isoprene and styrene. Other copolymerizable monomers are butadiene and chloroprene.

The process of preparing the bis(2,3-dimethylenebutyl) amines from allene and primary amines in the presence of a palladium or rhodium catalyst was heretofore unknown.

DETAILS OF THE INVENTION

The monomers of this invention are prepared from allene and ammonia or certain amines in the presence of a palladium or rhodium catalyst by the following scheme:

$$CH_2=C=CH_2 + H_2NR \xrightarrow{cat.}$$

$$\left(\underset{CH_3C-\overset{CH_2}{\overset{\|}{C}}-\overset{CH_2}{\overset{\|}{C}}-CH_2}{}\right)_2 NR$$
(II)

wherein R is defined as above.

Products of Formula II can be formed essentially without restriction from ammonia or primary amines.

Spectral evidence is available for formation of products of Formula II from primary amines in which the R group is secondary or tertiary alkyl, but such products have not been completely characterized.

The process is conducted at temperatures in the range of 70–150° C. The reaction time and pressure are not critical. Since reaction is faster at higher temperatures in the operable range and at elevated pressure, practical reaction times are determined by the temperature and pressure employed. Excessive pressure, i.e., above about 200 atmospheres, has little added value. The most commonly used and preferred temperature is about 120° C., and the optimum pressure at this temperature is about 70 atmospheres (ca. 1000 p.s.i.g.).

The allene:amine molar ratio in the process is not critical. However, the reactant ratio has an influence on the yield of product of Formula II obtained from primary amines. Compounds of Formula II are favored when the allene:primary amine ratio is 2:1 or greater, especially when ammonia or alkylamines are involved.

The process of preparing bis(2,3-dimethylenebutyl) amines from allene and operable amines requires the presence of a palladium or rhodium compound as catalyst. The amount of catalyst used is not critical, a molar ratio of catalyst to allene in the range of about 1:100 to 1:500 being recommended, the ratio of about 1:500 being generally used and preferred.

Any soluble compound of palladium or rhodium can be employed, including salts such as $PdCl_2$ or $RhCl_3$ and complexes containing Pd(II), Pd(O), Rh(III) and Rh(I). In situ reductions of the higher-valent species appear to occur, and the actual catalytic species are thought to be low-valent complexes containing Pd(O) or Rh(I). It will be understood that a plurality of catalysts may be used simultaneously and indeed may be normally present. Mixtures of palladium and rhodium compounds can also be used. Mixtures of catalysts provide no particular advantage.

Palladium compounds containing Pd(O) are preferred starting catalysts, e.g., bis(triphenylphosphine)(maleic anhydride)palladium(O). Examples of effective starting catalysts include, among others, dichlorobis(benzonitrile)palladium(II), bis(triphenylphosphine) (fumaronitrile)palladium(O) [for this new compound see my copending, coassigned application Ser. No. 74,195, filed Sept. 21, 1970] and the compounds listed in Table I.

TABLE I
Representative Pd(O) catalysts

| Name | Formula | |
|---|---|---|
| Tetrakis(triphenylphosphine)palladium(O) | $Pd[(C_6H_5)_3P]_4$ | |
| Bis(triphenylphosphine)(maleic anhydride)palladium(O) | $Pd[(C_6H_5)_3P]_2$ | 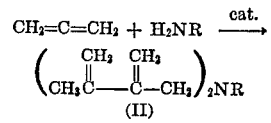 |

TABLE I—Continued

| Name | Formula |
|---|---|
| Bis(triphenylphosphine)(dimethylfumarate)palladium(0) | $Pd[(C_6H_5)_3P]_2\begin{bmatrix}CH_3O\overset{O}{\overset{\|}{C}}-CH\\ H\overset{}{C}-\overset{O}{\overset{\|}{C}}OCH_3\end{bmatrix}$ |
| Bis(triphenylphosphine)(dimethylmaleate)palladium(0) | $Pd[(C_6H_5)_3P]_2\begin{bmatrix}HC-\overset{O}{\overset{\|}{C}}OCH_3\\ HC-\overset{O}{\overset{\|}{C}}OCH_3\end{bmatrix}$ |
| Bis[1,2-bis(dimethylphosphino)ethane]palladium(0) | $Pd[(CH_3)_2PCH_2CH_2P(CH_3)_2]_2$ |
| Bis[o-bis(diethylphosphino)benzene]palladium(0) | $Pd\left[\begin{array}{c}\text{C}_6\text{H}_4\text{-P}(C_2H_5)_2\\ \text{-P}(C_2H_5)_2\end{array}\right]_2$ |
| Bis[bis(diphenylphosphino)methane]palladium(0) | $Pd[(C_6H_5)_2PCH_2P(C_6H_5)_2]_2$ |
| Bis[1,2-bis(diphenylphosphino)-ethane]palladium(0) | $Pd[C_6H_5)_2PCH_2CH_2P(C_6H_5)_2]_2$ |
| Bis[o-bis(dimethylarsino)benzene]palladium(0) | $Pd\left[\begin{array}{c}\text{C}_6\text{H}_4\text{-As}(CH_3)_2\\ \text{-As}(CH_3)_2\end{array}\right]_2$ |

Representative Rh (I) catalysts

| Name | Formula |
|---|---|
| Chlorotris(triphenylphosphine)-rhodium(I) | $Rh[(C_6H_5)_3P]_3Cl$ |
| Chloro(allene)bis(triphenylphosphine)rhodium(I) | $Rh[(C_6H_5)_3P]_2(C_3H_4)Cl$ |
| Chlorotris(triphenylarsine)rhodium(I) | $Rh[(C_6H_5)_3As]_3Cl$ |
| Chlorobis(triphenylphosphine)carbonylrhodium(I) | $Rh[(C_6H_5)_3P]_2(CO)Cl$ |
| μ-Dichlorotetraethylenedirhodium(I) | $Rh_2(C_2H_4)_4Cl_2$ |

Representative Rh(III) catalysts

| Name | Formula |
|---|---|
| Trinitratodiaquorhodium(III) | $Rh(H_2O)_2(NO_3)_3$ |
| Rhodium(III) fluoride | $RhF_3$ |
| Trisodium hexanitritorhodium(III) | $Na_3Rh(NO_2)_6$ |
| Tribromodiaquorhodium(III) | $Rh(H_2O)_2Br_3$ |
| Tribromoamminerhodium(III) | $Rh(NH_3)Br_3$ |
| Rhodium(III) iodide | $RhI_3$ |
| Trisulfatotetrakisaquorhodium(III) | $Rh_2(H_2O)_4(SO_4)_3$ |
| Triacetatodiaquorhodium(III) | $Rh(H_2O)_2(O\overset{O}{\overset{\|}{C}}CH_3)_3$ |
| Disodium pentabromohexaquorhodium(III) | $Na_2Rh(H_2O)_6Br_5$ |
| Triammonium hexachloroaquorhodium(III) | $(NH_4)_3Rh(H_2O)Cl_6$ |
| Tri(dimethylammonium)hexachloroaquorhodium(III) | $[(CH_3)_2NH_2]_3Rh(H_2O)Cl_6$ |
| Tri(ethylammonium)hexachloroaquorhodium(III) | $(C_2H_5NH_3)_3Rh(H_2O)Cl_6$ |
| Tri(trimethylammonium)hexabromoaquorhodium(III) | $[(CH_3)_3NH]_3Rh(H_2O)Br_6$ |
| Tribromohexa-amminerhodium (III) | $Rh(NH_3)_6Br_3$ |
| Chlorodinitratopenta-amminerhodium(III) | $Rh(NH_3)_5(NO_3)_2Cl$ |
| Trichlorotris(pyridine)-rhodium(III) | $Rh(C_5H_5N)_3Cl_3$ |
| Trichlorotris(triphenylphosphine)rhodium(III) | $Rh[(C_6H_5)_3P]_3Cl_3$ |
| Trichlorotris(triphenylphosphite)rhodium(III) | $Rh[(C_6H_5O)_3P]_3Cl_3$ |
| Tribromotris(triethylphosphine)rhodium(III) | $Rh[(C_2H_5)_3P]_3Br$ |
| Trichlorotris(triphenylarsine)rhodium(III) | $Rh[(C_6H_5)_3As]_3Cl_3$ |

Representative Pd (II) catalysts

| Name | Formula |
|---|---|
| Palladium(II) nitrite | $Pd(NO_2)_2$ |
| Do | $Pd(NO_3)_2$ |
| Palladium(II) fluoride | $PdF_2$ |
| Palladium(II) bromide | $PdBr_2$ |
| Palladium(II) iodide | $PdI_2$ |
| Palladium(II) sulfate | $PdSO_4$ |
| Palladium(II) cyanide | $Pd(CN)_2$ |
| Di(hydrogen oxalato)hexaaquopalladium(II) | $Pd(H_2O)_6(C_2HO_4)_2$ |
| Disodium tetranitritopalladium(II) | $Na_2Pd(NO_2)_4$ |
| Diammonium tetrachloropalladium(II) | $(NH_4)_2PdCl_4$ |
| Di(methylammonium)tetrachloropalladium(II) | $(CH_3NH_3)_2PdCl_4$ |
| Calcium tetrachloropalladium(II) | $CaPdCl_4$ |
| Dinitrtotetra-amminepalladium(II) | $Pd(NH_3)_4(NO_3)_2$ |
| Dichlorotetra-amminepalladium(II) | $Pd(NH_3)_4Cl_2$ |
| Dichloroaquotetra(ethylamine)palladium(II) | $Pd(H_2O)(C_2H_5NH_2)_4Cl_2$ |
| Dichlorodiamminepalladium(II) | $Pd(NH_3)_2Cl_2$ |
| Dichlorobis(methylamine)palladium(II) | $Pd(CH_3NH_2)_2Cl_2$ |
| Dibromobis(dipropylamine)palladium(II) | $Pd[(C_3H_7)_2NH]_2Br_2$ |
| Dichlorobis(dimethyl sulfide)palladium(II) | $Pd[(CH_3)_2S]_2Cl_2$ |
| Dichlorobis(tributylphosphine)palladium(II) | $Pd[(C_4H_9)_3P]_2Cl_2$ |
| Dichlorobis(triphenylphosphine)palladium(II) | $Pd[(C_6H_5)_3P]_2Cl_2$ |
| Dibromobis(triphenylarsine)palladium(II) | $Pd[(C_6H_5)_3As]_2Br_2$ |
| Tetrachlorobis(triphenylphosphine)dipalladium(II) | $Pd_2[(C_6H_5)_3P]_2Cl_4$ |
| Dichlorobis(triphenyl phosphite)palladium(II) | $Pd[(C_6H_5O)_3P]_2Cl_2$ |
| Dinitratobis(triphenyl phosphite)palladium(II) | $Pd[(C_6H_5O)_3P]_2(NO_3)_2$ |

The process can be operated with or without an added solvent, the only restriction being that acidic solvents which might react with the amine and strongly coordinating solvents that might interfere with catalyst activity, e.g., phosphites and phosphines, should be avoided. The reaction has been run successfully without added solvent, i.e., neat, and also with representative solvent media such as benzene (hydrocarbons), tetrahydrofuran (ethers), acetonitrile (nitriles), and hexamethylphosphoramide (N,N-dialkylamides). Low-boiling ethers such as tetrahydrofuran are preferred solvents for reasons of convenience in separation of products.

The process proceeds satisfactorily with the allene and amine reactants in either the liquid or vapor phase, and can be conducted by conventional batch or continuous procedures.

The bis(2,3-dimethylenebutyl)amines are ordinarily liquid materials which can be isolated by distillation under reduced pressure. They are 3-aminomethyl-substituted 2-methyl-1,3-butadienes (isoprenes), and accordingly are capable of vinyl polymerization and copolymerization by methods usually employed with dienes such as 1,3-butadiene and isoprene.

The homopolymers of the bis compounds and copolymers containing them in major proportions are generally insoluble and apparently highly crosslinked. These insoluble polymers are useful as weak anionic ion-exchange resins. Such resins are particularly suitable for the removal of strong acids from their solutions, as well as for selective absorption of acid vapors from industrial gaseous effluents. They can remove, for example, sulfuric, hydrochloric, hydrobromic, and hydrofluoric acids from their solutions, and sulfur dioxide, sulfur trioxide, hydrogen chloride, hydrogen fluoride, and hydrogen bromide from the air.

The use of ion-exchange resins in many laboratory and industrial operations is well known to those skilled in the art, and it is susceptible to many variations and modifications, some resins being particularly suitable, for example, for use with aqueous solvents and others with nonaqueous solvents. A skilled chemist can readily choose the best resin for his individual needs and operate his system efficiently after at most one or two experiments.

Copolymers containing the bis compounds in minor proportions are not necessarily insoluble but generally have properties characteristic of the polymers of the principal comonomers. The bis compound component, however, confers a crosslinking or curing potential, e.g., via vulcanization. Hence, the monomers of the bis compounds are useful as crosslinking agents in relatively small proportion with such conventional comonomers as styrene, methyl methacrylate or vinyl chloride. The bis compound component also tends to enhance the adhesive qualities of the copolymer whether cured or uncured, and accordingly the copolymers are generally useful as adhesives.

Polymerization and copolymerization of the bis(2,3-dimethylenebutyl)amines is effected by procedures generally used with vinyl, including diene, monomers. Emulsion polymerization methods [Marvel et al., J. Poly. Sci., 4, 583 (1949)] or solution polymerization procedures can be employed. Emulsion polymerization methods are preferred.

Representative comonomers useful in the preparation of copolymers with the bis(2,3-dimethylenebutyl)amines are listed in Table II.

TABLE II

| A: | B [1]: |
|---|---|
| Butadiene | Vinyl acetate |
| Isoprene | Acrolein |
| Piperylene | Methyl acrylate |
| Ethylene | Butyl acrylate |
| Propylene | Methyl methacrylate |
| Styrene | Butyl methacrylate |
| Vinyl fluoride | Amyl methacrylate |
| Vinyl chloride | Acrylonitrile |
| Methyl vinyl ether | Methyl vinyl ketone |
| 2-vinylpyridine | |

[1] Monomers in col. B may be copolymerized with tertiary bis(2,3-dimethylenebutyl)amines without difficulty. With acrylic monomers and montertiary bis(2,3-dimethylenebutyl) amines, copolymerization occurs in competition with addition of the amino group across the α,β-unsaturated system.

The structures of these polymers may be described by analogy to the nonfunctional 2,3-dialkyl and 2-alkyl butadienes. In these systems the polymers obtained [C. S. Marvel et al., J. of Polymer. Sci., 4, 583 (1949); M. Morton and W. E. Gibbs, J. Polymer. Sci. (A), 1, 2679 (1963)] using essentially the emulsion process used here, are generally mixtures of 1,2 and cis and trans 1,4 polymer units (in theory a copolymer). The percentage of 1,2 is usually 10–15% with 1,4 units supplying the remainder.

EMBODIMENTS OF THE INVENTION

There follow some representative examples providing additional details of preferred embodiments of the invention. In these examples, pressure is atmospheric unless designated in millimeters of mercury, parts and percentages are by weight, and temperature is in degree centigrade.

EXAMPLE 1

N,N-bis(2,3-dimethylenebutyl)amine

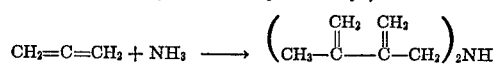

A solution of 1.46 g. (0.002 mole) of bis(triphenylphosphine)(maleic anhydride)palladium(O) in 100 ml. of tetrahydrofuran was charged to a 400 ml. stainless steel-lined autoclave. The autoclave was further charged with 40 g. (1 mole) of allene and 100 g. (6 moles) of ammonia, and heated to 120° C. for 6 hours with shaking.

The resulting solution was distilled directly through an 18" spinning band column to give a component, identified as N,N-bis(2,3-dimethylenebutyl)amine, having a boiling range of 68.5–74° C./0.41 mm. This component weighed 8.05 g. and represented an 18% conversion based on allene.

*Analysis.*—Calcd. for $C_{12}H_{19}N$ (percent): C, 81.30; H, 10.80. Found (percent): C, 80.75; H, 10.67.

EXAMPLE 2

N,N-bis(2,3-dimethylenebutyl)methylamine

A solution of 0.364 g. (0.0005 mole) of bis(triphenylphosphine)(maleic anhydride)palladium(O) in 25 ml. of tetrahydrofuran was charged to an 80 cc. stainless steel-lined autoclave. The autoclave was then charged with 6 g. (0.15 mole) of methylamine and 24 g. (0.60 mole) of allene, and the contents were heated to 120° C. for 6 hours with shaking.

The resulting solution was distilled giving 17 g. (59% conversion, based on methylamine) of N,N-bis(2,3-dimethylenebutyl)methylamine, B.P. 56–58.5° C./0.30 mm.

*Analysis.*—Calcd. for $C_{13}H_{21}N$ (percent): C, 81.7; H, 11.00; N, 7.30. Found (percent): C, 81.8; H, 10.82; N, 8.03.

EXAMPLE 3

N,N-bis(2,3-dimethylenebutyl)ethylamine

A solution of 4.5 g. (0.10 mole) of ethylamine and 0.364 g. (0.0005 mole) of bis(triphenylphosphine)(maleic anhydride)palladium(O) in 25 ml. of tetrahydrofuran was charged to an 80 cc. stainless steel-lined autoclave. The autoclave was then pressured with 16 g. (0.40 mole) of allene and the contents heated to 120° C. for 6 hours with shaking. Distillation of the resulting solution gave 12.7 g. (62% conversion, based on ethylamine) of N,N-bis(dimethylenebutyl)ethylamine, B.P. 62–65° C./0.20 mm.

*Analysis.*—Calcd. for $C_{14}H_{23}N$ (percent): C, 81.95; H, 11.30; N, 6.83. Found (percent): C, 82.05; H, 11.14; N, 7.32.

EXAMPLE 4

N,N-bis(2,3-dimethylenebutyl)methylamine homopolymer (A) A mixture of 2 g. of N,N-bis(2,3-dimethylenebutyl) methylamine, 0.10 ml. of Arquad® HT-50, 0.020 g. of azobisisobutyramidine hydrochloride and 5 ml. of water was stirred under nitrogen at 62° for 7 hours. At this point an additional 0.020 g. of the hydrochloride was added, and the mixture was stirred an additional 15 hours at 62°. The resulting mixture solidified on cooling to room temperature, and was broken up manually and stirred with 80 ml. of methanol. Filtration and washing with additional methanol gave a homopolymer of N,N-bis(2,3-dimethylenebutyl)methylamine in the form of a white powder which weighed 1.65 g. (83% yield) when dry. When heated in air to 360° C., this powder gave no evidence of melting but decomposed to a black powder.

(B)–(1) A mixture of 10 g. of poly[N,N-bis(2,3-dimethylene butyl)methylamine] of (A) and 5 ml. of methyl iodide in 20 ml. of benzene was refluxed for 1 hour. The cooled mixture was filtered and the residue washed with three 5-ml. portions of benzene. After drying over a nitrogen stream the tan powder weighed 1.555 g. representing a minimum conversion to the desired methiodide salt of 89%.

(2) A sample of salt from (1) (0.50 g., 1.0 mm. of I−) was stirred at room temperature with 5 ml. of water and 0.156 mg. (1.10 mmoles) of sodium sulfate for 1 hour. A color change of dark to light tan occurred after approximately 10 minutes. The mixture was filtered and washed with a minimum of water. The clear, colorless filtrate was exposed to bromine vapor and a brown turbid mixture was formed. When this mixture was stirred with carbon tetrachloride, the organic layer developed a strong purple color, indicating the presence of $I_2$.

(3) As a control, an experiment identical with (2) but omitting the sodium sulfate was run. This experiment resulted in a filtrate which gave a negative test for $I_2$. It is apparent, therefore, that the poly(methiodide) in (2) acted as an ion-exchange resin exchanging the I− for $SO_4^=$ when sodium sulfate was added to an aqueous suspension.

In addition to their use in forming polymers of various utilities, the novel monomers of this invention, because of their amine functionality, can also be used as antioxidants, corrosion inhibitors, intermediates to vulcanization accelerators (e.g., salts of long chain fatty acids), and intermediates to surfactants (e.g., quaternary N-salts of long chain sulfonic acids). For example, the compounds may be used to reduce air oxidation of rubber articles through their incorporation within the rubber or, alternatively, by storage of the article in an atmosphere of the compound. The free amines or their salts with weak acids, e.g., nitrites, may be used on iron or aluminum surfaces to inhibit corrosion. The secondary amino monomers may be converted to rubber vulcanization accelerators of the thiourea or dithiocarbamate types (e.g., $R_2NCSNR_2$ or $R_2NCS-S-S-CSNR_2$). The monomers containing more than eight carbon atoms can form water-dispersible salts with mineral acids and such salts can be used as surfactants in detergents.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

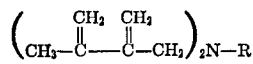

wherein R is hydrogen or alkyl of up to 18 carbons.

2. The compound of claim 1 named N,N-bis(2,3-dimethylenebutyl)amine.

References Cited
UNITED STATES PATENTS

| | | | |
|---|---|---|---|
| 3,494,965 | 2/1970 | Jones et al. | 260—583 H X |
| 3,679,748 | 7/1972 | Jones et al. | 260—584 R |

OTHER REFERENCES

Tishchenko et al.: Chemical Abstracts, vol. 51 (1957), 12,815 h.

LEWIS GOTTS, Primary Examiner

R. L. RAYMOND, Assistant Examiner

U.S. Cl. X.R.

260—89.7 N